Figure 1:
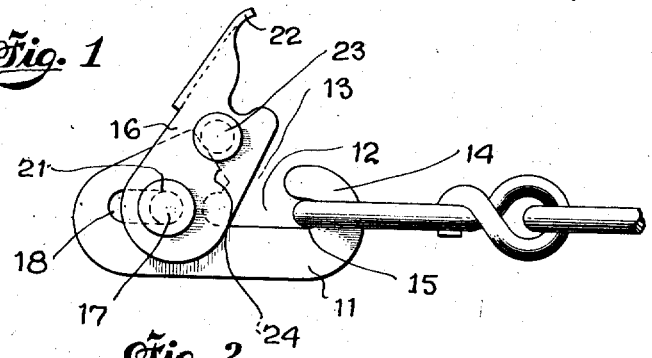

W. C. JOHNSON.

CHAIN FASTENER.

APPLICATION FILED AUG. 16, 1919.

Reissued Dec. 30, 1919.

14,783.

Walter C. Johnson Inventor

By his Attorneys.

Emery, Vaney, Blair, and Hoguet.

UNITED STATES PATENT OFFICE.

WALTER C. JOHNSON, OF SMITHMILL, PENNSYLVANIA.

CHAIN-FASTENER.

14,783. Specification of Reissued Letters Patent. Reissued Dec. 30, 1919.

Original No. 1,278,477, dated September 10, 1918, Serial No. 227,055, filed April 6, 1918. Application for reissue filed August 16, 1919. Serial No. 318,060.

*To all whom it may concern:*

Be it known that I, WALTER C. JOHNSON, a citizen of the United States, and a resident of the city of Smithmill, county of Clearfield, State of Pennsylvania, have invented an Improvement in Chain-Fasteners, of which the following is a specification.

My invention relates to chain fasteners and is particularly designed to provide an improved fastener for securing together the ends of an automobile anti-skid chain although not in any way limited to such use.

Figure 2:
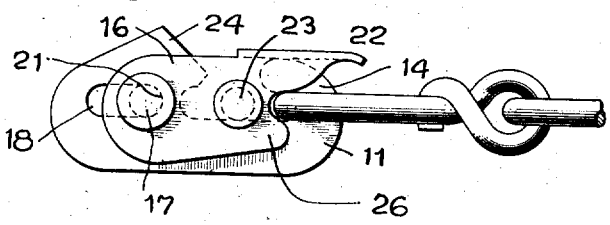
Figure 3:
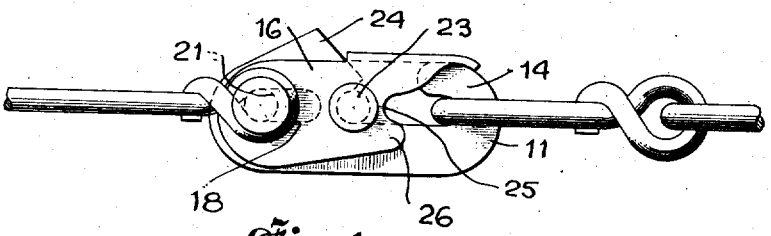
Figure 4:
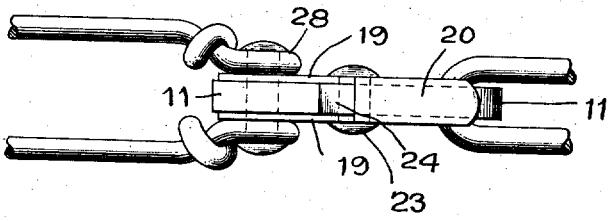

In this specification I have disclosed, for purposes of illustration, one embodiment which my invention may assume. In the drawings accompanying this specification:

Figure 1 represents this illustrative embodiment of my chain fastener in open position, Fig. 2 illustrates the chain fastener of Fig. 1 in closed position under certain conditions of slackened tension, Fig. 3 illustrates this chain fastener in normal closed position, while Fig. 4 is a top view of the closed fastener as illustrated in Fig. 3.

My invention consists essentially of means to which the free end of a chain may be detachably secured and means coöperating therewith for holding the chain in secured position. To secure the chain I may employ any means which is suitable for the purpose, such, for example, as the single flat plate 11 provided with a preferably longitudinal slot 12 opening at 13 through one wall of the plate 11 to thus form on the plate an overhanging lip or hook 14 having a recess 15 in which the free chain end may seat.

I may employ any suitable means to hold the chain in secured position and may connect this means to the plate 11 in any suitable manner. For example the retaining means may consist of a keeper 16 provided with a pivot 17 passing through a second slot 18 in the plate 11 which is also preferably longitudinal. The pivot 17 is, therefore, capable of both rotative and lateral movement in the slot 18. I may form the keeper in any suitable manner as by bending a single piece of sheet metal to form two sides 19 preferably alike and connected by a crosspiece 20. Each side may be provided with an aperture 21 through which the pivot pin 17 may extend and the crosspiece 20 is preferably provided with a bill 22 so formed as to overlie the hook 14 when the keeper is swung into closed position.

In order to hold the keeper in closed position under normal operation I may connect the two sides 19 by a pin or rivet 23 extending there-between and so positioned as to underlie the projection 24 on the plate 12 when the keeper is in normal closed position as shown in Figs. 3 and 4. In order to hold the keeper in this normal closed position I may connect the permanently attached chain end to the keeper in any desired manner as by connecting it to the ends of the pivot pin 17 and if such a construction is adopted this pivot pin may preferably be made in the form of a rivet having a groove 28 in each head thereof. With the chain connected to the chain fastener in the above described manner it is apparent that the tension on the chain will hold the keeper in normal closed position with the pin 23 lying beneath the projection 24 and thus positively locking the keeper in position. In order to guard against opening of the fastener on slackening of the chain, I prefer to form the forward edges of the sides 19 with pockets 25 disposed substantially along the axis of the longitudinal slot 12 and to so arrange the two slots in the plate 11 that they will be in substantially direct alinement. Any thrust of the free chain end against the keeper is thus delivered against the pocket 25 and, due to the arrangement of the parts, this thrust has no component tending to open the keeper. In order to prevent the keeper from creeping open when the chain tension is removed, I may provide each side of the keeper with an extension 26 so formed that it will lie beneath the free chain end should the keeper be moved to abnormal closed position and will thus function to prevent opening of the keeper under such conditions.

It will be apparent from the above description that the improved chain fastener herein described provides means for engaging the free end of the chain, means for securing the free end of the chain in engaged position, and various means for holding the securing means in operative position. The embodiment herein disclosed is but one form which my invention may assume.

Other embodiments of my invention and various modifications of this embodiment will still retain some or all of the advantages of my invention. The invention, therefore, is not limited to this illustrative embodiment or to the advantages herein pointed out but includes the full range of equivalents especially as included in the appended claims.

I claim:

1. In a chain fastener, a hook member having a channel portion and a longitudinally disposed elongated opening at its end alined with said channel portion, a keeper pivoted at one end in said opening, the said keeper adapted at its outer end to engage over the end of said hook member, and a chain connected to the pivot of said keeper.

2. In a chain fastener, a hook member having a channel portion and an elongated slot at the rear end thereof alined with said channel portion, an inclined face adjacent the rear end of said hook member, a keeper pivoted at one end in said slot and adapted to swing downwardly over said member, a pin carried by said keeper and being adapted to ride on said inclined surface, and a chain connected to the pivot of said keeper.

3. In a chain fastener, a plate having an elongated longitudinally extending channel communicating with one edge of said plate for a portion of its length, a keeper pivoted at one end to said plate and adapted to close over the open portion of said channel, the pivot for said keeper alined with said channel and capable of moving longitudinally of said plate, a stud carried by said keeper and adapted to enter said channel at the open portion thereof, when the keeper is in closed position, a shoulder overhanging said channel at one end and adapted to hold said stud against movement away from said plate, and a chain secured to the pivot of said keeper.

4. In a chain fastener, a plate having a longitudinally disposed channel therein, a hook bill at one end of said channel, an overhanging shoulder at the opposite end of said channel, the said plate having an elongated slot therein alined with said channel, a pivot pin in said slot, a keeper connected at one end to said pin and adapted to close over said bill, a stud on said keeper, an enlarged portion on said plate at one side thereof and having an inclined face adjacent said shoulder, the said stud adapted to ride upon said face, and a chain link connected to said pivot pin.

5. In a chain fastener, a plate having a channel portion, a hook at one end, and a slot at the opposite end disposed parallel with said channel portion, a keeper having a pivot pin at one end arranged in said slot and adapted at its free end to close over said hook, a pin on said keeper so positioned as to enter the said channel portion when the keeper is closed and to engage the rear wall of the said channel when the pivot of said keeper has moved to its limit in one direction, and a chain connected to the pivot of said keeper.

6. In a chain fastener, a plate having a hook at one end, a keeper swingingly mounted on said plate and capable of sliding longitudinally thereon, means for holding said keeper against swinging movement when the latter has moved to closed position and to its limit in one direction, a chain connected to said keeper at its point of connection with said plate, and the said connecting point of the chain, and the locking means being longitudinally alined with the channel portion of said hook when the said keeper is in closed position.

7. A chain fastener comprising a hook and a keeper united by a pivotal connection constructed to permit translatory movement of said keeper relative to said hook, means on said hook and keeper to hold said keeper closed in one relative translatory position thereof, and means on the keeper portion of said pivotal connection providing for a direct attachment of the chain thereto.

8. A chain fastener comprising a hook and a keeper, means on said hook and keeper to hold said keeper closed in one relative position of said keeper and hook, and a connection between said keeper and hook permitting movement of said keeper and hook into and out of said relative position but so arranged that lateral pressure on said keeper cannot effect said movement.

9. A chain fastener comprising a hook and a keeper united by a pivotal connection constructed to permit translatory movement of said keeper longitudinally only of said hook, and means on said hook and keeper to hold said keeper closed in one longitudinal position thereof.

10. A chain fastener comprising a hook and a keeper, said keeper being provided with a projection lying below the level of the detachable chain end when said keeper is closed.

11. A chain fastener comprising a hook having a slot to receive the free end of said chain, and a keeper to hold said chain in said slot, means on said hook and said keeper to lock said keeper closed, a connection between said keeper and said hook to permit motion of said keeper relative to said hook out of locked position, and means to prevent opening of said keeper when said keeper is moved from locked position past an intermediate free position.

12. A chain fastener comprising a hook having a slot to receive a free end of said chain, and a keeper to hold said chain in said slot, means on said hook and said keeper to lock said keeper closed, a connection between said keeper and said hook to permit motion of said keeper relative to said hook out of locked position, and a projection on said keeper arranged to underlie said chain when said keeper has moved from locked position past an intermediate free position to thus prevent opening of said keeper.

13. A chain fastener comprising a hook having a slot to receive the free end of said chain, and a keeper to hold said chain in said slot, means on said hook and said keeper to lock said keeper closed, a connection between said keeper and said hook to permit motion of said keeper relative to said hook out of locked position, said keeper being so constructed that longitudinal movement of said chain is ineffective to open said keeper, and means to prevent opening of said keeper when said keeper is moved from locked position past an intermediate free position.

In testimony whereof, I have signed my name to this specification this 11 day of Aug. 1919.

WALTER C. JOHNSON.